US009562458B2

United States Patent
Amtmann et al.

(10) Patent No.: US 9,562,458 B2
(45) Date of Patent: Feb. 7, 2017

(54) FILTER INSERT

(75) Inventors: Markus Amtmann, Schwäbisch Gmünd (DE); Hans Erlach, Kühnsdorf (AT); Werner Schadler, Seggauberg (AT)

(73) Assignee: Mahle International GmbH (DE)

( * ) Notice: Subject to any disclaimer, the term of this patent is extended or adjusted under 35 U.S.C. 154(b) by 905 days.

(21) Appl. No.: 12/872,305

(22) Filed: Aug. 31, 2010

(65) Prior Publication Data

US 2011/0056961 A1 Mar. 10, 2011

(30) Foreign Application Priority Data

Sep. 1, 2009 (DE) .................. 10 2009 039 567

(51) Int. Cl.
| | | |
|---|---|---|
| *B01D 35/027* | (2006.01) | |
| *F01N 3/20* | (2006.01) | |
| *B01D 46/42* | (2006.01) | |
| *B01D 35/18* | (2006.01) | |
| *B01D 53/00* | (2006.01) | |

(52) U.S. Cl.
CPC ............. *F01N 3/2066* (2013.01); *B01D 35/18* (2013.01); *B01D 46/4263* (2013.01); *B01D 53/005* (2013.01); *F01N 2610/02* (2013.01); *F01N 2610/10* (2013.01); *F01N 2610/14* (2013.01); *F01N 2610/1406* (2013.01); *F01N 2610/1426* (2013.01); *Y02T 10/24* (2013.01)

(58) Field of Classification Search
CPC .................................................. B01D 35/18
USPC ........................................................ 210/184
See application file for complete search history.

(56) References Cited

U.S. PATENT DOCUMENTS

| | | | | |
|---|---|---|---|---|
| 4,571,481 A | * | 2/1986 | Leary ............................ | 219/205 |
| 2003/0116490 A1 | * | 6/2003 | Keyster et al. ............... | 210/184 |
| 2008/0277401 A1 | | 11/2008 | Hafner | |
| 2009/0078692 A1 | | 3/2009 | Starck | |
| 2009/0084736 A1 | * | 4/2009 | Rocheux et al. ............. | 210/774 |
| 2010/0200485 A1 | * | 8/2010 | Parra Navarrete et al. .. | 210/184 |

FOREIGN PATENT DOCUMENTS

| | | | |
|---|---|---|---|
| DE | 102005031510 A1 | 1/2007 | |
| DE | 102005037201 A1 | 2/2007 | |
| DE | 202007006636 U1 | 7/2007 | |
| DE | 102006048721 A1 | 4/2008 | |
| DE | 102006050807 A1 | 4/2008 | |
| DE | 102007050272 A1 | 4/2009 | |
| DE | 102008010105 A1 | 8/2009 | |
| EP | 1925354 A1 | 5/2008 | |
| FR | 2915185 A1 | 10/2008 | |
| SU | 1813912 * | 5/1997 | .......... F02M 31/125 |
| WO | WO-2007017080 A1 | 2/2007 | |
| WO | WO2007020179 * | 2/2007 | ............ F02M 37/22 |

(Continued)

OTHER PUBLICATIONS

English abstract for DE-102005031510.

(Continued)

*Primary Examiner* — Peter Keyworth
(74) *Attorney, Agent, or Firm* — Fishaman Stewart PLLC

(57) ABSTRACT

A tank filter insert having a filter insert housing having at least one inlet and at least one outlet; a filter device for filtering the liquid stored in the tank; and a heating device, which heats the housing at least in the region of the at least one inlet, the at least one outlet, and the filter device.

12 Claims, 2 Drawing Sheets

(56) References Cited

FOREIGN PATENT DOCUMENTS

WO    WO-2007/141312 A1    12/2007

OTHER PUBLICATIONS

English abstract for DE-102006048721.
English abstract for DE-102006050807.
English abstract for DE-102008010105.
English abstract for FR-2915185.
English abstract for EP-1925354.
German Search Report for EP-10173662.

* cited by examiner

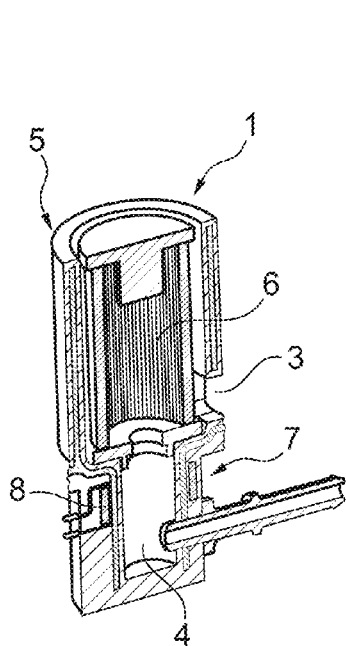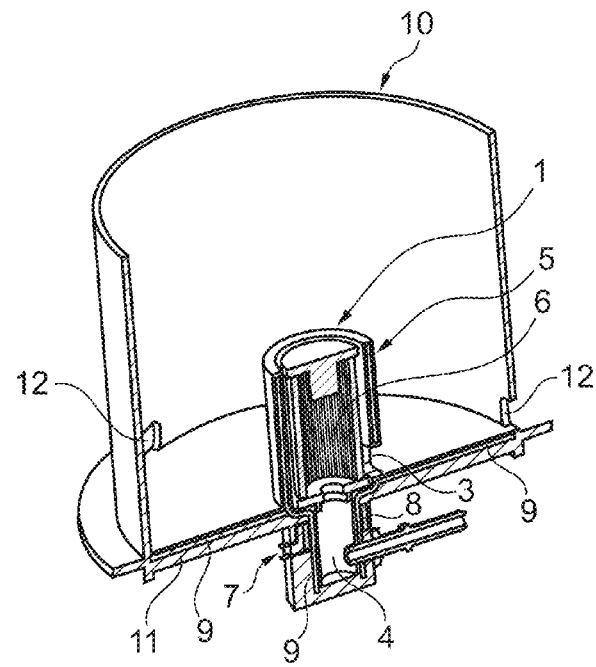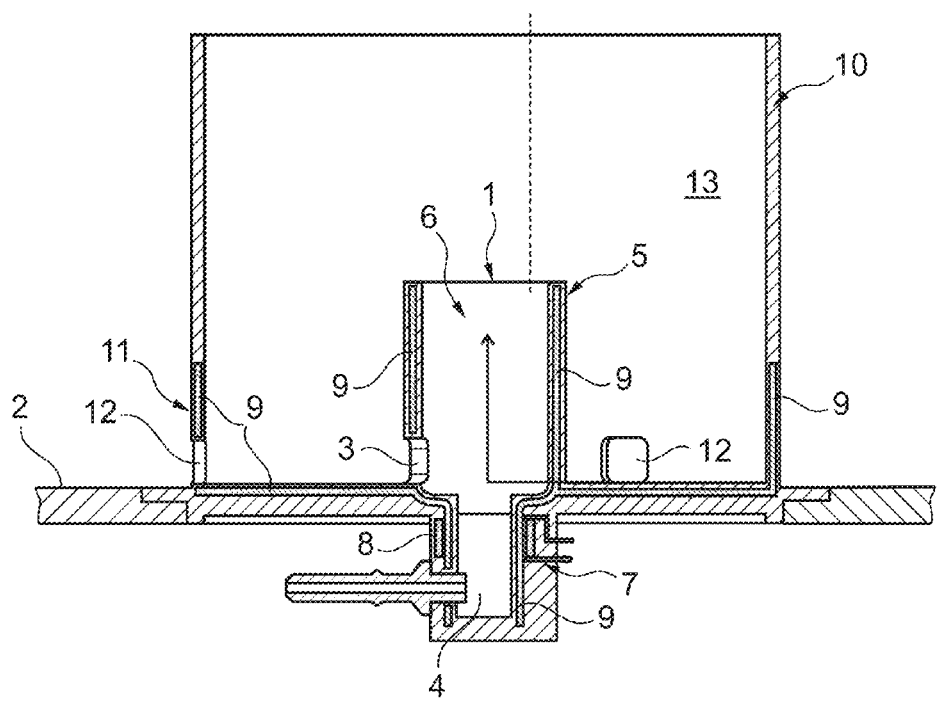

FILTER INSERT

CROSS-REFERENCES TO RELATED APPLICATION

This application claims priority to German patent application DE 10 2009 039 567.9 filed on Sep. 1, 2009, which is hereby incorporated by reference in its entirety.

TECHNICAL FIELD

The present invention relates to a filter insert for inserting into a tank, in particular into a urea tank. The invention relates in addition to an insert comprising such a filter insert and a tank comprising such an insert or filter insert.

BACKGROUND

To be able to significantly reduce a pollutant emission, in particular of motor vehicles, today, the so-called SCR method is used which contributes to reduce the nitrogen oxide emission of diesel vehicles. The ammonia required for the SCR reaction is not used directly, i.e. in pure form, but usually in the form of an aqueous urea solution. From this urea solution, ammonia and carbon dioxide are generated through a hydrolysis reaction, wherein the ammonia generated in this manner can react in a special SCR catalyst at an adequate temperature with the nitrogen oxides of the exhaust gas. The consumption of urea solution depends on the raw emission and in particular also on a load condition of the motor vehicle so that always a certain volume of urea solution must be carried along in a tank provided for this purpose. Since the urea solution contains water for dilution, there can be the danger at extreme temperatures that the aqueous urea solution freezes in the tank provided for this purpose and, therefore, the SCR reaction required for the nitrogen oxide reduction can not take place. Thus, it is essential for a reliable operation and for compliance with the statutory emission standards that the freezing of the urea solution can be reliably prevented. Since in the known urea tanks usually also filter devices for filtering the aqueous urea solution are provided which can have a tendency to clog at low temperatures, moreover, it must be ensured that also such filter devices work without problems and properly at all occurring temperatures.

SUMMARY

The present invention is primarily concerned with the problem to provide a filter insert for inserting into a tank, in particular into a UREA tank, which filter insert is functioning independently of usually occurring outside temperatures.

This problem is solved according to the invention by the subject matters of the independent claims. Advantageous embodiments are subject matter of the dependent claims.

The present invention is based on the general idea to heat a filter insert for inserting into a tank, in particular into a UREA tank (urea tank), over a large area, however, in particular in the region of an inlet and an outlet and a filter device thereby ensuring a reliable function of the filter insert also at low outside temperatures. For this purpose, the filter insert according to the invention comprises a housing with at least one inlet and at least one outlet, wherein between the same, at least one filter device is arranged for filtering the liquid, in particular urea, stored in the tank. The heating device according to the invention heats the housing of the filter insert, namely at least in the region of the inlet, the outlet, and the filter device so that even at low temperatures, the full functional capability of the filter insert can be ensured. Previously, for example, heating devices were known which heated the urea in the tank but not the outlet of the filter insert so that at low temperatures, the urea in the region of the outlet froze, which also resulted in an immediate malfunction of the filter insert. By means of the configuration according to the invention of the filter insert by means of which the inlet, the outlet as well as the filter device arranged therebetween can be heated, it is possible to ensure the full functional capability of the filter insert at low temperatures.

In an advantageous development of the solution according to the invention, the heating device has at least one electrical heating element, in particular a PTC element. Such PTC heating elements (positive temperature coefficient) comprise usually electrically conductive materials which are able to conduct the electrical current better at low temperatures than at high temperatures. Their electrical resistance thus increases with increasing temperature. Such PTC elements can be preset to adequate temperatures below which the heating has to be carried out. Thus, if the actual temperature falls below the preset temperature, the heating device starts heating the liquid content in the filter insert, whereas, if the actual temperature in the filter insert exceeds the predefined temperature of the PTC element, the heating device stops heating the liquid arranged in the filter insert.

In an advantageous development of the solution according to the invention, in the region of the at least one inlet, the at least one outlet, and the filter device, the housing of the filter insert comprises heat conducting bodies which are connected in a heat transferring manner with the at least one heating element of the heating device. Such heat conducting bodies allow a heating of the filter over a large area and in a target-oriented manner and, moreover, can be spray-coated with plastic and can in particular be injection molded into a respective wall section of the housing of the filter insert. Such heat conducting bodies are usually made from a material with good thermal conductivity, for example metal, and, due to their high rigidity, can in addition be used for supporting the shape and for reinforcing the filter insert. Through an adequate configuration of the heat conducting bodies, a systematic heating of the filter insert can be achieved.

Further important features and advantages arise from the sub-claims, from the drawings, and from the associated description of the figures based on the drawings.

It is to be understood that the above mentioned features and the features yet to be explained hereinafter can be used not only in the respectively mentioned combination but also in other combinations or alone without departing from the scope of the present invention.

BRIEF DESCRIPTION OF THE DRAWING

Preferred exemplary embodiments of the invention are illustrated in the drawings and are explained in the following description in more detail, wherein identical reference numbers refer to identical, or similar, or functionally identical components.

In the figures, schematically:

FIG. 1 shows a filter insert according to the invention in a sectional view, FIG. 2 shows an insert according to the invention with such a filter insert as shown in FIG. 1, FIG. 3 shows a tank, in particular a urea tank with an inserted insert according to FIG. 2.

DETAILED DESCRIPTION

Figure 4:
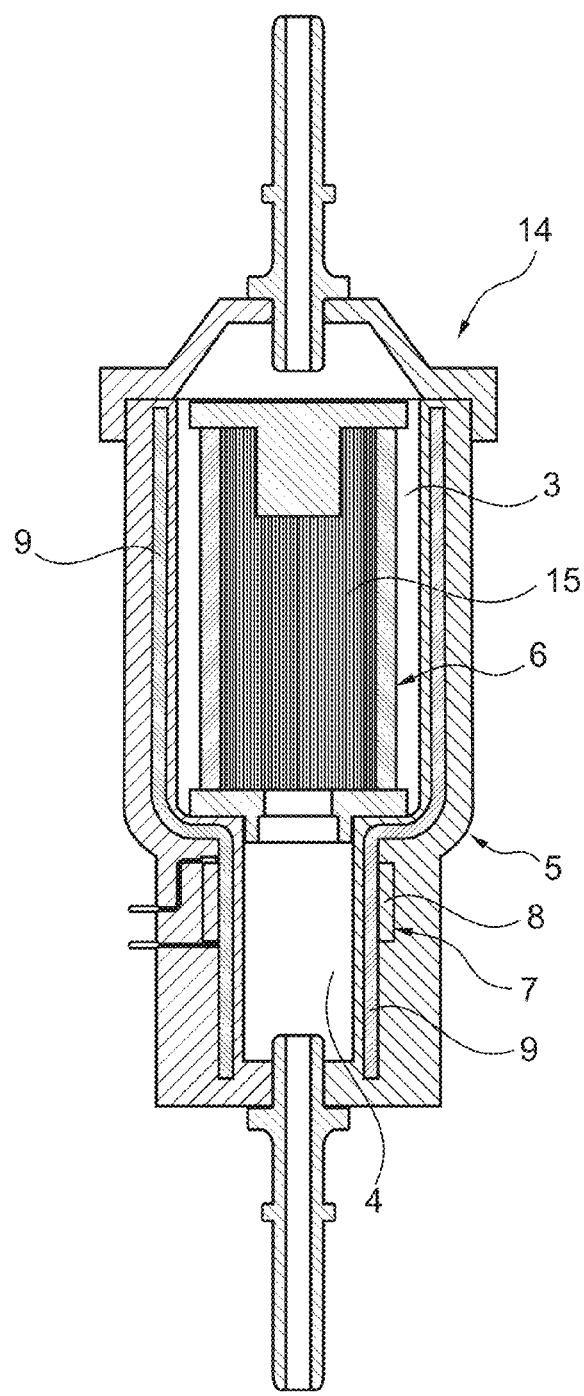
FIG. 4 shows a heatable external filter device.

According to FIG. 1, a filter insert 1 according to the invention for inserting into a tank 2, in particular into a UREA tank 2 (cf. FIG. 3), that is, into a urea tank, comprises a housing 5 having at least one inlet 3 and at least one outlet 4. Moreover, the filter insert 1 according to the invention comprises a filter device 6 (cf. also FIGS. 2 and 3) for filtering the liquid stored in tank 2, for example urea. Since the urea is diluted with water for carrying out a SCR reaction (selective catalytic reaction), the functional capability of the filter insert 1 must also be ensured at low temperatures at which the water portion contained in the urea could potentially freeze. For this purpose, the filter insert 1 comprises a heating device 7 which heats the housing 5 of the filter insert 1 at least in the region of the inlet 3, the outlet 4, and the filter device 6.

The heating device has at least one electrical heating element 8 which, for example, is configured as so-called PTC element (positive temperature coefficient). Said at least one heating element 8 is connected in a heat transferring manner to heat conducting bodies 9 which extend into the housing 5 of the filter insert 1 at least in the region of the at least one inlet 3, the at least one outlet 4, and the filter device 6. The heat conducting bodies 9 are spray-coated with plastic and are in particular injection molded into a respective wall section of the housing 5 of the filter insert 1. The heat conducting bodies 9 are made of a material with good thermal conductivity, for example metal and, in particular, aluminum, thereby providing a fast and uniform distribution of the heat generated by the heating element 8 of the heating device 7.

When viewing FIG. 2 it is apparent that the filter insert 1 shown in FIG. 1 can also form an integral part of an insert inserted into a tank 2, wherein in this case, the heating device 7 heats, in addition, wall sections 11 of the insert 10, in particular in the region of an intake 12 of the insert 10. With such an insert 10 it is possible, compared to the filter insert 1 shown in FIG. 1, to apply heating energy to a greater volume of urea.

Viewing now FIG. 3 it is apparent that with respect to an interior 13 of the insert 10, a plastic coating of the heat conducting bodies 9 is smaller than towards the outside so that the heating energy radiated from the heat conducting bodies 9 is primarily transferred to the liquid in the insert 10, for example the urea therein, whereas the plastic coating, which is comparatively thick towards the outside, provides for an adequate insulation.

The illustration in FIG. 3 shows how the insert 10 of FIG. 2 is inserted in a wall of the tank 2, wherein the tightness between the tank 2 and the insert 10 is usually generated by welding. Of course, it is also conceivable that a filter insert 1 as shown according to FIG. 1 is directly inserted into a wall of the tank 2 and is in particular welded therein.

Of particular advantage of the insert 1 according to the invention or the insert 10 is that the same provides a comparatively large heating surface in the form of the present heat conducting bodies 9, wherein the same, due to their integration into the wall sections of the housing 5 or the insert 10 need only little additional installation space. At the same time, the filter device 6 can be heated over a large area and thus in a reliable manner because the heat conducting bodies 9 surround the same over a large area. The filter device 6 can comprise a ring filter element. However, in addition to the filter device 6, inlet 3, outlet 4 and, if necessary, also an intake 12 of the insert 10 is heated as well as an interior 13 of the insert 10, whereby freezing of the aqueous urea solution is not to be feared in the region of the inlet 3 nor in the region of the filter device 6 or the outlet 4. Through the comparatively thick plastic layer on the outside of the insert 10, an insulation with respect to the environment and thus a directed heat flow into the interior 13 of the insert 10 can be achieved. In particular, with the solution according to the invention, a partial freezing of the urea, for example in the region of the outlet 4 or the inlet 3 or the filter device 6, which also would result in a complete malfunction, can be avoided.

FIG. 4 shows a urea filter device 14 comprising a housing 5 having at least one inlet 3 and at least one outlet 4, a filter element 15 for filtering urea, and a heating device 7 which heats the housing 5 of the filter insert 1 at least in the region of the at least one inlet 3, outlet 4, and the filter element 15. The urea filter device 14 can be installed externally with respect to a UREA (urea) tank 2. It is obvious that the invention does not have to be limited to a urea filter device 14, but can also be implemented in other liquid filter devices.

The invention claimed is:

1. An insert comprising:
   an insert housing at least partially enclosing an interior, the insert housing defining at least one intake for communicating a fluid into the interior;
   a filter insert housing having a plurality of wall sections defining at least one inlet and at least one outlet, wherein the at least one inlet is in fluid communication with the interior of the insert housing;
   a filter device arranged in the filter insert housing; and
   a heating device configured to heat the wall sections of the filter insert housing defining at least one of the at least one inlet and the at least one outlet, wherein the heating device has at least one electrical heating element positioned in the filter insert housing, such that the heating device heats a fluid inside the filter insert housing and inside the insert housing;
   wherein the heating device includes a plurality of heat conducting bodies, wherein at least some of the plurality of heat conducting bodies are disposed within the wall sections of the filter insert housing defining the at least one inlet and the at least one outlet, and at least one heat conducting body of the plurality of heat conducting bodies is integrated within the insert housing, wherein the plurality of heat conducting bodies are connected in a heat transferring manner with the heating element such that the plurality of heat conducting bodies distribute heat generated by the electrical heating element into the fluid inside the insert housing and inside the filter insert housing; and
   wherein an insulating layer is disposed on the at least one heat conducting body that is integrated within the insert housing, and wherein the insulating layer has a smaller thickness on an inner side of the at least one heat conducting body facing towards the interior than on an outer side facing away from the interior.

2. The insert according to claim 1, wherein the plurality of heat conducting bodies are composed of a metal material.

3. The insert according to claim 1, wherein the at least some of the plurality of heat conducting bodies disposed within the wall sections of the filter insert surround the at least one inlet and the at least one outlet.

4. The insert according to claim 1, wherein the insulating layer of the at least one heat conducting body is continuous such that the smaller thickness is defined along the inner side facing towards the interior.

5. The insert according to claim 1, wherein the insulating layer is a spray coated plastic and defines the smaller thickness on the inner side along an extent of the at least one heat conducting body.

6. The insert according to claim 1, wherein the at least one heat conducting body that is integrated within the insert housing extends from the electrical heating element to surround the at least one intake and distribute heat generated by the electrical heating element into the fluid communicated into the interior via the at least one intake.

7. The insert according to claim 1, wherein the at least one electrical element is a PTC element.

8. A UREA tank, comprising:
a tank;
an insert configured to be inserted into the tank, and the insert includes an insert housing wall coupled to the tank and at least partially enclosing an interior, wherein the insert housing wall defines at least one intake for communicating a fluid into the interior;
a filter insert arranged in the insert, the filter insert including filter insert housing, a filter device arranged in the filter insert housing, and a heating device;
wherein the filter insert housing has a plurality of wall sections defining at least one inlet and at least one outlet, wherein the at least one inlet is in fluid communication with the interior of the insert;
wherein the filter device is configured to filter the fluid stored in the tank; and
wherein the heating device is configured to heat the wall sections defining at least one of the at least one inlet and the at least one outlet and the insert housing wall defining the at least one intake, wherein the heating device has at least one electrical heating element;
wherein the heating device includes a plurality of heat conducting bodies that are disposed within the insert housing wall and within the wall sections defining the at least one inlet and the at least one outlet of the filter insert, and the heat conducting bodies are connected in a heat transferring manner with the heating element such that the plurality of heat conducting bodies distribute heat generated by the electrical heating element into the fluid inside the insert and inside the filter insert; and
wherein at least one heat conducting body disposed within the insert housing wall surrounds the at least one intake and distributes heat generated by the electrical heating element into the fluid communicated into the interior via the at least one intake.

9. The UREA tank according to claim 8, wherein the at least one electrical heating element is a positive temperature coefficient (PTC) element.

10. The UREA tank according to claim 8, wherein the insert is welded to the tank.

11. The UREA tank according to claim 8, wherein the at least one heat conducting body disposed within the insert housing wall is covered by an insulating layer, and wherein the insulating layer has a smaller thickness on an inner side of the at least one heat conducting body facing towards the interior than an outer side facing away from the interior.

12. The UREA tank according to claim 11, wherein the at least one electrical heating element is a PTC element.

* * * * *